United States Patent [19]

Fujisaki et al.

[11] Patent Number: 4,758,718
[45] Date of Patent: Jul. 19, 1988

[54] HIGH SECURITY IC CARD WITH AN UPDATABLE PASSWORD

[75] Inventors: Kunio Fujisaki; Akiko Iwanaga, both of Owariasahi, Japan

[73] Assignee: Hitachi, Ltd., Tokyo, Japan

[21] Appl. No.: 829,987

[22] Filed: Feb. 18, 1986

[30] Foreign Application Priority Data

Feb. 27, 1985 [JP] Japan .................................. 60-36376

[51] Int. Cl.⁴ ........................ G06K 19/06; G06K 5/00
[52] U.S. Cl. .................................... 235/487; 235/492; 235/380; 340/825.32
[58] Field of Search ............ 235/379, 380, 382, 382.5, 235/487, 492, 488; 340/825.31, 825.32, 823.33, 825.34

[56] References Cited

U.S. PATENT DOCUMENTS

| | | | |
|---|---|---|---|
| 3,731,076 | 5/1973 | Nagata et al. ........................ | 235/380 |
| 3,761,683 | 9/1973 | Rogers ........................... | 340/825.31 |
| 3,971,916 | 7/1976 | Moreno ............................... | 364/200 |
| 4,007,355 | 2/1977 | Moreno ............................... | 235/492 |
| 4,092,524 | 5/1978 | Moreno ............................... | 235/487 |
| 4,102,493 | 7/1978 | Moreno ............................... | 235/488 |
| 4,207,555 | 6/1980 | Trombly .......................... | 235/382.5 |
| 4,341,951 | 7/1982 | Benton ................................ | 235/379 |
| 4,439,670 | 3/1984 | Basset et al. ........................ | 235/382 |
| 4,575,621 | 3/1986 | Dreifus ................................ | 235/492 |
| 4,614,861 | 9/1986 | Pavlov et al. ........................ | 235/379 |

FOREIGN PATENT DOCUMENTS 53-86144  7/1978  Japan .
53-6491   8/1978  Japan .
59-123070 7/1984  Japan .

Primary Examiner—Raymond F. Cardillo
Assistant Examiner—Robert A. Weinhardt
Attorney, Agent, or Firm—Antonelli, Terry & Wands

[57] ABSTRACT

A high security and rewritable IC card has a microprocessor, a memory, and a keyboard. The memory has a password registration area, an error counter area in which the number of occurrences of an error in inputting a password is stored, and a card information area. The microprocessor controls a password registration operation, registers the password inputted through the keyboard in the password registration area. When the registered password is to be updated, the microprocessor clears the password registration area in the memory to allow writing of a new password only when the microprocessor detects that a password data inputted by a card user matches the registered password and the error count in the error counter is no more than a predetermined count.

6 Claims, 5 Drawing Sheets

3(0011), 9(1001), 8(1000)
5(0101), F(1111)

FIG. 7A
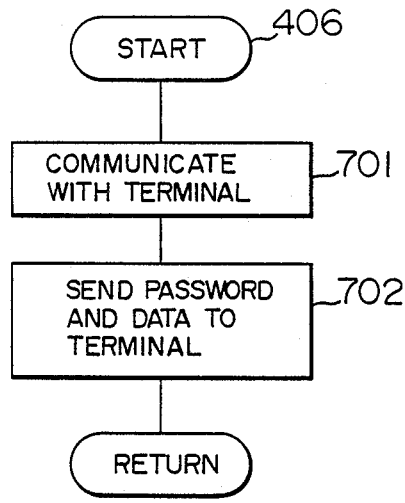
FIG. 7B
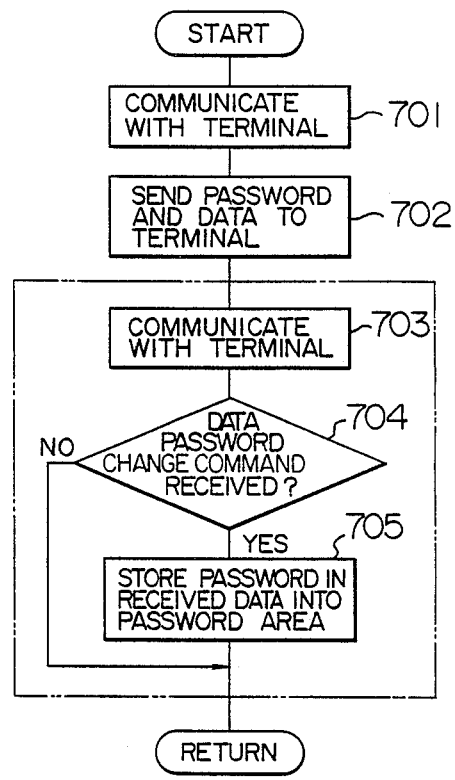
FIG. 7C
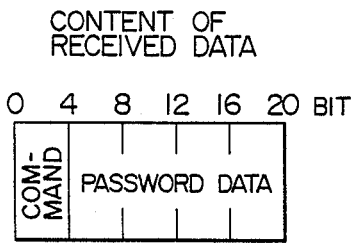
CONTENT OF RECEIVED DATA
FIG. 7D
COMMAND IN RECEIVED DATA
| CODE | CONTENT |
|---|---|
| 1 | PASSWORD CHANGE COMMAND |
|  | NON-DEFINED |

HIGH SECURITY IC CARD WITH AN UPDATABLE PASSWORD

BACKGROUND OF THE INVENTION

The present invention relates to an integrated circuit (IC) card, and more particularly to an IC card which can be used as an identification medium for personal identification and for preventing unauthorized use thereof.

In the past, a magnetic card has been used for a bank card or credit card. In a magnetic card system, a personal identification data for identifying an owner of the magnetic card, which is called a password is stored in the magnetic card, and an equality between the password electromagnetically read from the magnetic card loaded to a card reader and a password manually entered by the card owner is checked to determine whether the user of the card is a valid card owner. However, the following problems reside in the magnetic card.

(i) The password recorded on the magnetic card can be read by simple hardware and hence the use by an unauthorized person can be easily accomplished.

(ii) The password should be known only to the owner; however, hardware for writing the password is necessary and a person who prepares the card writes the password based on an application of the owner. As a result, a critical problem remains that there is a person other than the owner who can be aware of the password.

(iii) A security protection of an automatic machine such as a cash dispenser or vending machine is not perfect and the prevention of leakage of the password is not perfect. Nevertheless, the password cannot be changed by the owner and the card is used even after another person has become acquainted with the password.

For the problem (i) above, an improvement was proposed in Japanese Examined Patent Publication No. 53-6491 but it does not recognize and solve the problems (ii) and (iii) above, although Japanese Unexamined Patent Application (Kokai) No. 53-86144 discloses a dedicated password change device for cash card available for change at specified locations. Accordingly, the security against the forgery of the card and the unauthorized readout is not assured.

In recent years, an IC card which contains a microprocessor IC or memory IC has been developed. It is superior to the magnetic card in performance and memory capacity. A basic construction of the IC card is disclosed in Japanese Examined Patent Publication No. 53-6491 to Arimura, issued on Mar. 8, 1978 and Roland Moreno U.S. Pat. Nos. 4,007,355; 4,102,493; 4,092,524 and 3,971,916, but considerations on problems of the security have not sufficiently been taken. Technical trend of the IC card is described in NIKKEI ELECTRONICS Dec. 2, 1985, pages 275-292 and Dec. 16, 1985, pages 249-262. (This does not mean that those are prior art to the present invention.) Japanese Unexamined Patent Publication (Kokai) No. 59-123070 discloses a temporal transaction method using a temporally available password (not prior art).

SUMMARY OF THE INVENTION

It is an object of the present invention to provide an IC card which resolves a problem of security, which enables an owner of a card to register a password without being known by another person, which enables the owner of the card to alter the password without being known by another person and which can prevent unauthorized use by another person.

In order to achieve the above object, in accordance with one feature of the present invention, an IC card having a microprocessor and a memory is used. The memory has a password registration area in which the password is to be registered and a password update area in which updating data to update the password registered in the registration area is stored. The IC card has keys or keyboard used to enter the password. The password is entered by a keying operation and the microprocessor controls the registration of the password and registers the password entered in the password registration area. When the registered password is to be changed, the number of times of input error for the password registered in the microprocessor is checked based on data preset in the password update area, and if the number of times of error is smaller than a predetermined number, the registration area as well as the password update area is cleared and a newly entered password is permitted to be registered in the registration area.

BRIEF DESCRIPTION OF THE DRAWINGS

FIGS. 5 to 8 show flow charts indicating sub-routines, in which FIG. 6 shows a flowchart for password registration, FIGS. 7A and 7B show the manners of communication between the card and the terminal. FIGS. 7C and 7D show a received data format and its detail and FIG. 8 shows a flowchart for an entry operation, respectively

DESCRIPTION OF THE PREFERRED EMBODIMENTS

One embodiment of the present invention will now be described with reference to the accompanying drawings.

Figure 1:
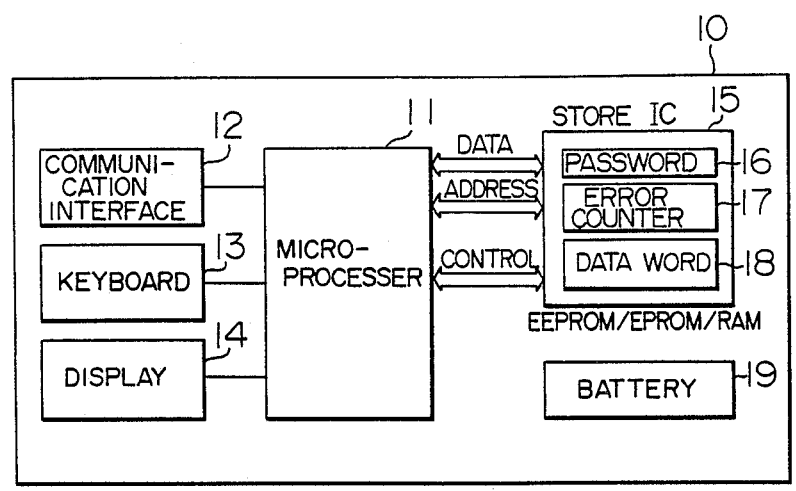
FIG. 1 shows a block diagram of an embodiment of an IC card of the present invention.

FIG. 1 is a block diagram of one embodiment of the IC card of the present invention.

In FIG. 1, a numeral 10 denotes an IC card used as an identification medium for identifying a person, numeral 11 denotes a microprocessor for controlling registration and updating of a password data, numeral 12 denotes a communication interface for connection with a terminal device, numeral 13 denotes a keyboard for entering the password data, numeral 14 denotes a display device such as an LCD for displaying the password data, numeral 15 denotes a memory having areas for storing data necessary for registration and updating of the password, numeral 16 denotes a password memory area (referred to as password area hereinafter) in the memory 15, the password area having, for example, 16 bits (a 4-digit word in BCD), numeral 17 denotes an area for storing the number of times of non-coincidence of the password (i.e., error counter) in the memory 15, numeral 18 denotes an area for storing data representing a type (e.g. cash card) and attributes (e.g. branch code, account number etc. for transactions) of the IC card 10, and numeral 19 denotes a battery.

Figure 2:
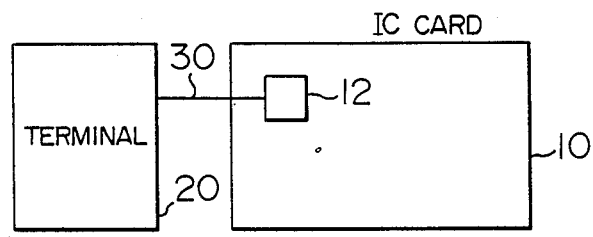
FIG. 2 is a block diagram of a terminal device to which the IC card is loaded.

FIG. 2 is a block diagram of a terminal device to which the IC card 10 is loaded.

In FIG. 2, numeral 20 denotes the terminal device connected to the IC card 10, and numeral 30 denotes a communication line which connects the terminal device 20 to the communication interface 12 in the IC card 10. The interface which establishes the communication line includes power supply terminal (Vcc), reset signal input terminal (RST), input terminal (CLK) to an operation clock, ground (GND), write input terminal (Vpp) to a PROM and input/output terminal (I/O) for serially transferring data. The data is transmitted through the communication line in accordance with a protocol which is conventional to exchange the signals.

Figure 3:
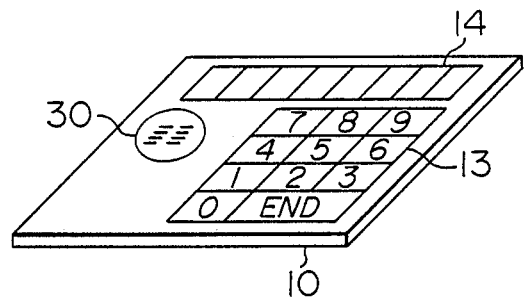
FIG. 3 is an external view of the IC card of the embodiment of the present invention.

FIG. 3 shows an external view of the IC card of the present embodiment in which the same reference numerals as those shown in FIGS. 1 and 2 are used.

Figure 4:
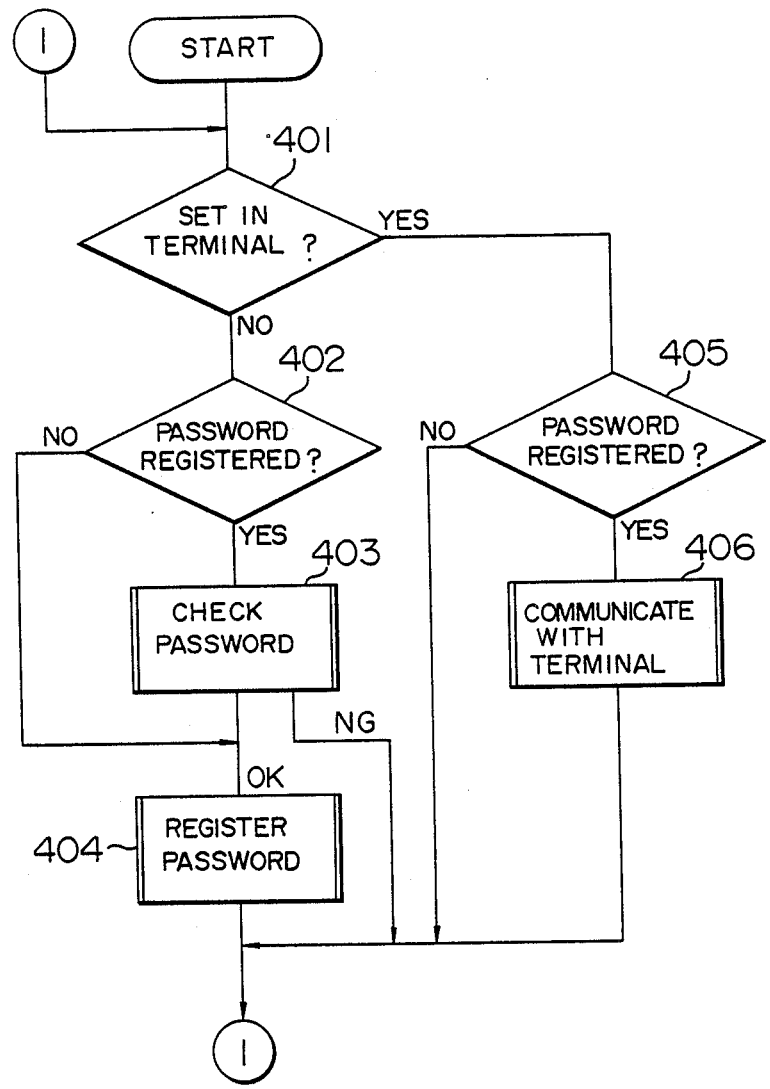
FIG. 4 shows a flow chart for a microprocessor in the IC card.

FIG. 4 shows a flow chart for the operation of the microprocessor 11 of FIG. 1, and FIGS. 5 to 8 show flow charts for subroutines used in the processing of FIG. 4.

Figure 9:
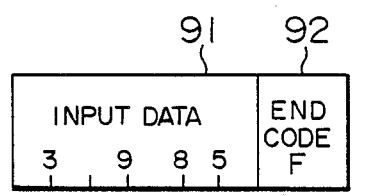
FIG. 9 shows an example of input data from a keyboard.

FIG. 9 shows a format of input data from the keyboard 13. It consists of input data 91 (e.g. a 4-digit word "3985" in decimal notation) and an end code (e.g. "F" in BCD) 92.

In the present embodiment, the operation of the IC card 10 is controlled by the microprocessor 11 which includes the memory having a control program stored therein and operates in accordance with the flow chart of FIG. 4 when the battery 19 is set therein. The control program may instead be stored in the memory 15 or another ROM when the IC card 10 is delivered to the card owner, the battery 19 has been set therein.

The registration and updating of the password in the IC card 10 are explained with reference to the flow charts of FIGS. 4 to 8.

Figure 6:
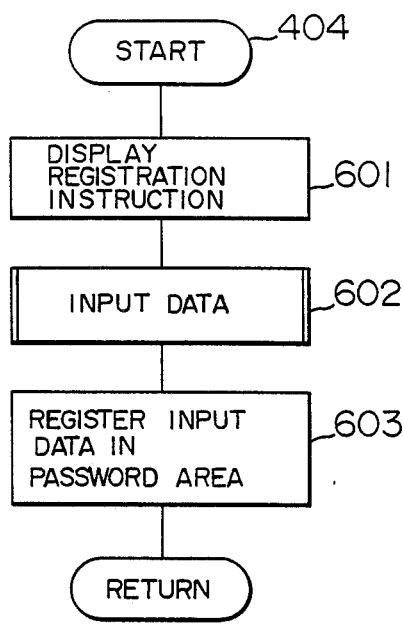
Figure 8:
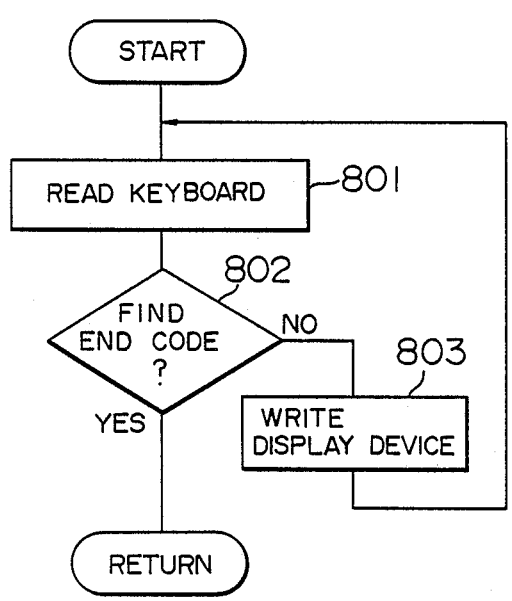

Referring to the flow chart of FIG. 4, the operation for setting the password when the IC card 10 is first delivered to the card owner is explained. When the IC card 10 is delivered to the card owner, the password has not yet been set in the terminal (reader/writer) (step 401). In the step 401, when the IC card 10 is loaded into the terminal 20 to connect it with the terminal through the communication interface 12 and the communication path 30, a specified signal, such as a clock pulse is supplied from the terminal to the IC card and is detected by a sensor in the microprocessor 11 to thereby determine whether the IC card is operatively loaded in the terminal, so that the user can know whether the IC card communicates with the terminal using a microprogram held in the card. Whether the password has been registered in the IC card 10 or not is checked (step 402). When the IC card 10 is delivered to the card owner, the memory 15 has been cleared and hence the password has not yet been registered. Accordingly, password registration (step 404) is carried out and an instruction therefor is displayed on the display device 14. The flow chart for the password registration is shown in FIG. 6. The necessity of the password registration is displayed on the display device 14 (step 601) and entry operation is carried out (step 602). The entry operation (step 602) is a sub-routine shown by the flow chart of FIG. 8. The input data from the keyboard 13 is read (step 801) and the presence or absence of the end code is checked (step 802). If the end code is not included, it is stored in a register of the microprocessor 11 and is informed to the display device 14 and the data read operation (step 801) is repeated. When the end code is read, the processing of FIG. 6 is carried out again. The input data inputted by the entry operation (step 602) is shown in FIG. 9. A password is first set by the card owner. Then, the input data is registered in the password area 16 of the memory 15. Thus, the registration of the password by the card owner is completed (step 603).

In order to securely prevent an unauthorized person highly skilled in the IC technologies from reading a password stored in the IC card, a password to and from the password memory can be enciphered and deciphered, respectively, using an encrypt and decrypt key as described in "DES mode of operation" of FIPS PUB. '81.

For example, a 16-bit password may be written in the memory 16 of the IC card in the following manner. A 4-bit BCD number "$2^3 2^2 2^1 2^0$" is converted to alter the bit sequence as $2^2 2^0 2^1 2^3$. When a decimal number for one digit is "3", a corresponding binary number "0011" is stored in the memory in the form of "0110". In a second example, each 4-bit data of the 16-bit password may be stored in a distributed area of the password memory and the addressing thereof is approved only by a password setting and updating program. In a third example, 4-digit BCD numbers of a password inputted in the keyboard are enciphered by adding or subtracting a certain number or different numbers to each number of the password in the microprocessor 11 and an enciphered password is stored in the password memory 16. For example, the microprocessor of the IC card operates to convert an input decimal number n into another number n', in accordance with a predetermined rule or formula given by a program associated with a password check program. When n'=10—n and n="7152", a BCD number of "3958" is registered into the IC password memory. It should be noted that a different enciphering and deciphering program may be loaded to each card and various encrypt and decrypt keys are applicable to processings of password registration, password checking and password updating according to the present invention. To confirm the starting of a password updating procedure with high security there may be provided a further step of instructing entry of a password or a modification thereof directly before the new password data inputting step 602. The modification of a password to be entered to request the updating of the password may be an opposite-sequence number of the password number currently registered in the IC card.

The updating of the password by the card owner is now explained.

Figure 5:
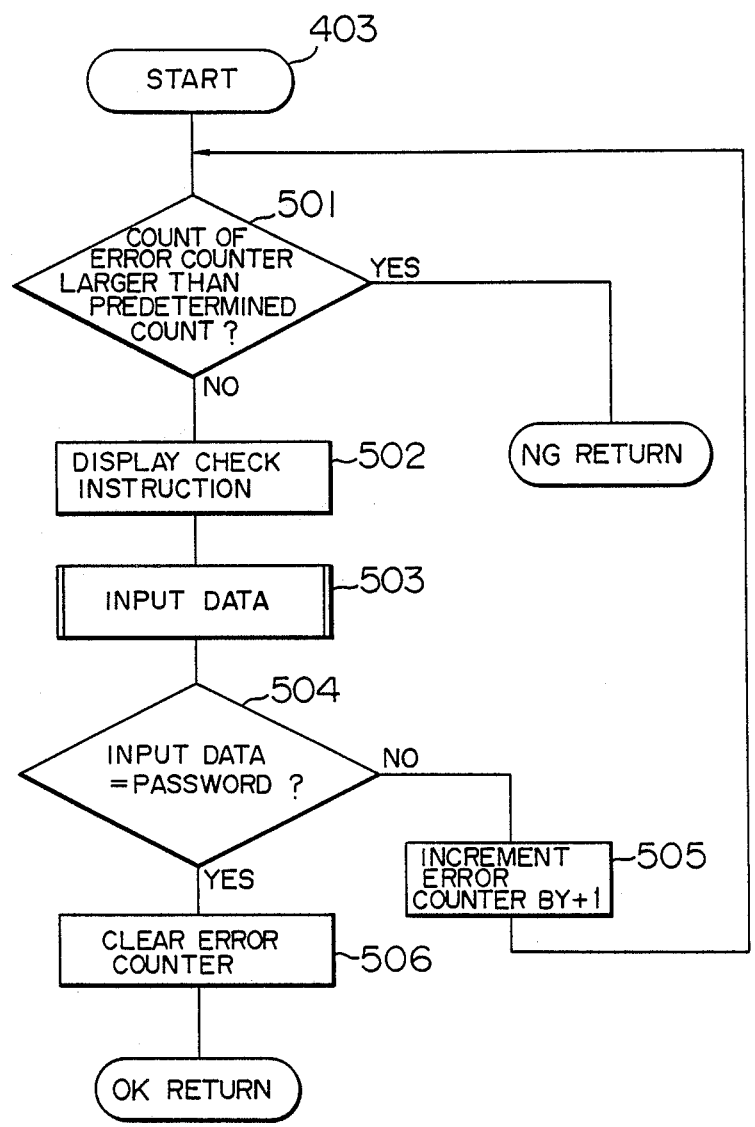

As the password has been registered, the decision in the step 402 of FIG. 4 is YES (registered), and a password check operation (step 403) is carried out. The flow chart therefor is shown in FIG. 5. Whether the count of the error counter 17 is larger than a predetermined count (for example, three times which data is programmed in the microprocessor 11) or not is checked. Since the memory 15 has been cleared when the IC card 10 is delivered to the card owner, the count of the error counter 17 is not larger than the predetermined count (step 501) an indication for the password check is displayed on the display device 14 (step 502) and an entry operation is carried out (step 503). The entry operation has been explained with reference to FIGS. 6, 8 and 9. The password is entered to identify the person by the card owner.

The equality between the input data 91 and the password stored in the password area 16 in the IC card 10 is checked (step 504), and when they are equal, the error counter 17 is cleared (step 506) and the subroutine is terminated. The updating of the password is carried out by executing the password registration operation (step 404) of FIG. 4. If the input data 91 and the password are not equal, a possible cause therefor is misentry of the password by the card holder or entry of the password by an unauthorized person. Accordingly, the error counter 17 is incremented by one (step 505) and the password check operation is carried out again. If the cause is the misentry of the password by the card owner, a correct entry will be done within a predetermined number of times and the error counter 17 is cleared (step 506) when the correct password is entered. If the cause is the misentry of the password by the unauthorized person, it is almost impossible to enter the correct password within the predetermined number of times. Thus, when the count of the error counter 17 exceeds the predetermined count (step 501), the subroutine is terminated with error. Since the error counter 17 is not cleared, the updating of the password cannot be effected. An indication "Use not permitted" is displayed on the display device. Each time the error counter is cleared its contents may be fetched in a trace area of the memory 15 to know the history of misentries.

An application in which the IC card 10 is used in an automatic machine (terminal device) such as an automatic cash dispenser is explained.

The card is usually inserted into a card insertion port of the terminal device so that the configuration shown in FIG. 2 is established and the IC card 10 can communicate with the terminal device 20 through the communication line 30.

Referring back to FIG. 4, since the IC card has been set in the terminal device (step 401), whether the password has been set in the inserted IC card or not is checked (step 405). Since the password has been registered, terminal communication operation is carried out (step 406). FIG. 7A shows the flow chart therefor. The communication is done between the inserted IC card and the terminal device in accordance with a predetermined protocol (step 701), and the password stored in the IC card and a password data inputted by a person using the card are sent to the terminal device 20 (step 702). The terminal device 20 identifies the person by using the registered password data and the inputted password data. If the password has not yet been registered, the communication between the IC card 10 and the terminal device 20 is not permitted and a misoperation is prevented.

FIG. 7B shows a modification of FIG. 7A in which the password update operation is effected by loading the IC card into the terminal and using the keyboard of the terminal. FIGS. 7C and 7D indicate examples of a data format and a command received from the terminal side.

In accordance with the present embodiment, the password can be registered and updated or changed as desired without being known by other persons. This can be done by the display providing instructions or guidance on the display device 14 and the entry by the keyboard 13. Since the number of occurences of an unmatched password is stored in the internal memory, the use by the unauthorized person can be prevented. Since data other than the password can be stored in the internal memory, the IC card can be easily applied to various security-purposes.

What is claimed is:

1. An IC card for use with a transaction terminal comprising:
   a microprocessor;
   an interface for electrically communicating with said terminal;
   a memory having a password registration area for registering a password and a password rewrite permission data area for storing data used to determined whether said password registered in said password registration area may be rewritten; and
   a keyboard for entering said password;
   said password rewrite permission data area including error count means responsive to a password rewrite request for incrementing a count number representing the number of occurrences of incorrect entries each time an incorrect password is entered into the microprocessor and permitting entry of a password to said microprocessor when said count number does not exceed a predetermined value; and wherein
   said microprocessor includes determination means responsive to an output of said error counter means for receiving an entered password and for determing whether it is correct based on the registered password, and permission means responsive to said determination means for permitting entry of a new password by said keyboard to said password registration area to rewrite the registered password.

2. An IC card according to claim 1, wherein said microprocessor includes clear means for clearing the count number stored in said password rewrite permission data area when a correct password is inputted.

3. An IC card according to claim 1, further comprising:
   a display device connected to said microprocessor; and means for causing said display device to display a registration instruction and a readout of said keyboard when no data is registered in said password registration area.

4. An IC card according to claim 3, wherein said microprocessor includes means for causing said display device input data and for generating an instruction signal to repeat the reading of said keyboard until said microprocessor reads an end code from said keyboard.

5. An IC card according to claim 4, wherein said microprocessor registers a password data inputted through said keyboard into said password registration area in response to said end code from said keyboard.

6. An IC card according to claim 3, wherein said determination means includes first compare means responsive to said password rewrite request for comparing said counter stored in said error counter means with a predetermined count.

* * * * *